United States Patent [19]

Yu et al.

[11] Patent Number: 5,432,216
[45] Date of Patent: Jul. 11, 1995

[54] POLYACETAL RESIN COMPOSITION

[75] Inventors: Jian Yu, Tokyo; Satoshi Nagai, Yokkaichi; Ken-ichi Shimizu; Toshiaki Okuzono, both of Hiratsuka, all of Japan

[73] Assignee: Mitsubishi Gas Chemical Company, Inc., Tokyo, Japan

[21] Appl. No.: 240,569

[22] Filed: May 11, 1994

[30] Foreign Application Priority Data

May 12, 1993 [JP] Japan ................................. 5-110293
Jan. 25, 1994 [JP] Japan ................................. 6-006495

[51] Int. Cl.$^6$ .................. C08K 5/3435; C08K 5/3475
[52] U.S. Cl. .................................... 524/102; 524/91; 524/291; 524/343; 524/359
[58] Field of Search ................. 524/91, 102, 291, 343, 524/359

[56] References Cited

U.S. PATENT DOCUMENTS

| | | | |
|---|---|---|---|
| 4,446,263 | 5/1984 | Bryant | 524/100 |
| 4,717,745 | 1/1988 | Ishii et al. | 524/100 |
| 4,975,478 | 12/1990 | Okuda | 524/100 |
| 5,149,723 | 9/1992 | Hayes | 524/100 |
| 5,171,770 | 12/1992 | Nakagawa | 524/102 |
| 5,208,279 | 5/1993 | Katsumata | 524/102 |
| 5,232,965 | 8/1993 | Hayes | 524/102 |

FOREIGN PATENT DOCUMENTS

| | | |
|---|---|---|
| 0412840 | 2/1991 | European Pat. Off. |
| 0426482 | 5/1991 | European Pat. Off. |
| 2808675 | 9/1978 | Germany |

Primary Examiner—Kriellion S. Morgan
Attorney, Agent, or Firm—Wenderoth, Lind & Ponack

[57] ABSTRACT

A polyacetal resin composition which comprises (A) 100 parts by weight of a polyacetal resin, (B) 0.1 to 1.5 parts by weight of at least one kind selected from the group of light stabilizers represented by the following formula (1)

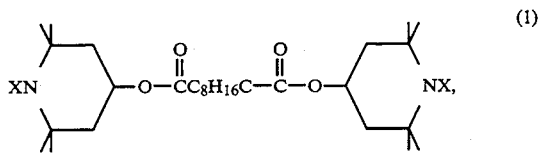

wherein two X's are the same or different and each denotes a hydrogen atom or a methyl group, (C) 0.1 to 1.5 parts by weight of an ultraviolet light absorber, (D) 0.1 to 3 parts by weight of polyethylene, (E) 0.1 to 5 parts by weight of polyethylene glycol, and (F) 0.1 to 10 parts by weight of a polymer of a methacrylate ester. This polyacetal resin composition is excellent in weather resistance and molding processability.

7 Claims, 2 Drawing Sheets

POLYACETAL RESIN COMPOSITION

BACKGROUND OF THE INVENTION

1. Field of the Invention

This invention relates to a novel polyacetal resin composition. More specifically, this invention relates to a novel polyacetal resin composition which is excellent in weather resistance and molding processability.

2. Prior Art

Polyacetal resins are excellent in physical properties such as abrasion resistance, wear resistance, fatigue resistance, heat resistance, and electric properties and chemical properties such as chemical resistance and water resistance. Accordingly, the polyacetal resins have been used in electric and electronic fields and a field of building construction. Besides, they have found wide application in parts, etc. in fields of automobile industry, miscereaneous goods, and so forth.

However, molded articles formed of the polyacetal resins are known to be inferior in weather resistance. That is, it is known that when such molded articles are exposed to sunlight or indoor lighting for a long time and further to wind and rain, cracks occur on the surfaces of the molded articles, and as occurrence of the cracks proceeds, gloss is lost, the appearance deteriorates, and mechanical properties notably decrease.

SUMMARY OF THE INVENTION

It is an object of this invention to provide a novel polyacetal resin composition.

A particular object of this invention is to provide a polyacetal resin composition which is excellent in weather resistance (light resistance).

Another object of this invention is to provide such a polyacetal resin composition that when the components of the polyacetal resin composition are extruded, while being melt-kneaded, into strands with an extruder to pelletize the polyacetal resin composition, occurrence of a gum-like resin substance at an extrusion die and occurrence of surging can be substantially suppressed.

Still another object of this invention is to provide a polyacetal resin composition which can give an injection-molded article with beautiful surface finish and substantially without occurrence of a flow mark.

A further object of this invention is to provide a polyacetal resin composition in which additives that are added to a polyacetal resin are substantially restrained from bleeding out on a surface of a molded article.

A still further object of this invention is to provide a molded article of a polyacetal resin composition which is excellent in weather resistance, which is substantially free from a flow mark and on which surface additives substantially do not bleed out.

In accordance with this invention, there is provided a polyacetal resin composition which comprises:
(A) 100 parts by weight of a polyacetal resin,
(B) 0.1 to 1.5 parts by weight of at least one member selected from the group of light stabilizers represented by the following formula (1)

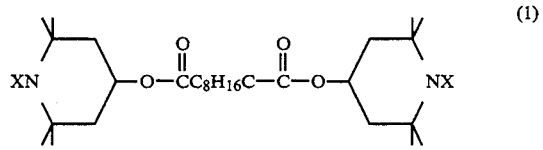

wherein two X's are the same or different and each denotes a hydrogen atom or a methyl group,
(C) 0.1 to 1.5 parts by weight of an ultraviolet light absorber,
(D) 0.1 to 3 parts by weight of polyethylene,
(E) 0.1 to 5 parts by weight of polyethylene glycol, and
(F) 0.1 to 10 parts by weight of a polymer of a methacrylate ester.

In accordance with this invention, there is further provided a molded article which is obtained by injection-molding the above polyacetal resin composition.

The aforesaid objects of this invention can be achieved by these inventions.

This invention will be described in detail below, whereby the other objects and advantages of this invention will be made clear.

DETAILED DESCRIPTION OF THE INVENTION

Figure 1:
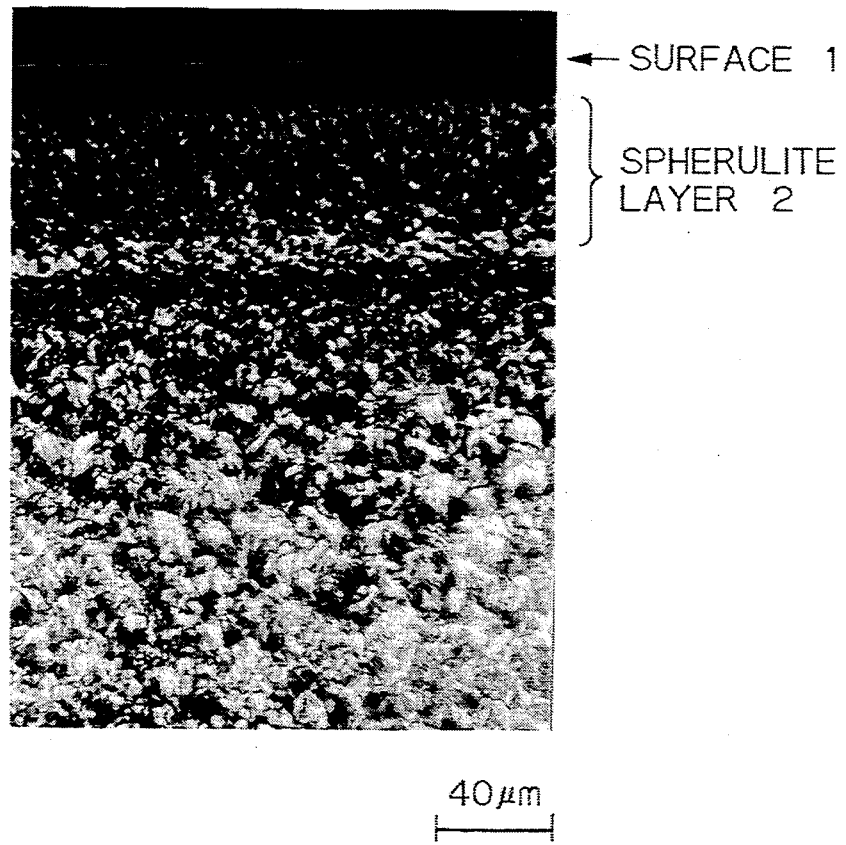
FIG. 1 is a photo, taken by a polarizing microscope, of a section of a portion near a surface of an injection-molded article of a polyacetal resin.

A polyacetal resin (A) used in a polyacetal resin composition of this invention includes polyacetal (polyoxymethylene) and a copolymer containing an oxymethylene unit as a main recurring unit and a small amount of a recurring unit other than the oxymethylene unit.

For example, the polyacetal resin (A) includes resins of the following three types (1) to (3).

(1) Oxymethylene homopolymer which is prepared from formaldehyde, its trimer (trioxane) or its tetramer (tetraoxane) and composed substantially of an oxymethylene unit alone.

(2) Copolymer containing 99.9 to 80% by weight of an oxymethylene unit and 0.1 to 20% by weight of a recurring unit other than the above oxymethylene unit. Examples of the recurring unit other than the oxymethylene unit include oxyalkylene units which can be derived from cyclic ethers having 2 to 8 carbon atoms, such as ethylene oxide, epichlorohydrin, 1,3-dioxolane, 1,3,5-trioxepane and formal of glycol. The recurring unit other than the oxymethylene unit may be randomly distributed in the copolymer or may be blocked and combined with polyoxymethylene chain to form a block copolymer. Further, the block of said recurring unit may be combined with polyoxymethylene chain in branched state to form a graft copolymer.

(3) Polyoxymethylene having a crosslinked structure to such an extent that melt moldability is not impaired.

In all of the above three cases, the terminal of the polyacetal resin (A) may be subjected to treatment for preventing depolymerization.

A melt flow rate (MFR) of the polyacetal resin (A) is preferably 0.5 to 60, especially preferably 2.5 to 30, as measured at 190° C. under a load of 2.16 kg according to ASTM D-1238.

The light stabilizer (B) which is used in the polyacetal resin composition of this invention is at least one member selected from the group of light stabilizers represented by the above formula (1). Of these light stabilizers, bis(2,2,6,6-tetramethyl-4-piperidyl)sebacate and bis(N-methyl-2,2,6,6-tetramethyl-4-piperidyl)sebacate are preferable. They can be used either singly or in combination.

The light stabilizer represented by the above formula (1) has a suitable molecular weight. Accordingly, said light stabilizer, when used as the light stabilizer (B) of this invention, substantially neither volatilizes nor bleeds out on the surface of the molded article while the polyacetal resin composition of this invention is molded or the molded article is actually used. When additives bleed out on the surface of the molded article, an appearance of the molded article deteriorates.

Further, the light stabilizer represented by the above formula (1) exhibits a remarkable synergistic effect with an ultraviolet light absorber (C) which will be later described, and the polyacetal resin composition of this invention shows excellent weather resistance (light resistance) by concurrently using the ultraviolet light absorber (C).

An antioxidant can be added to the polyacetal resin composition of this invention in order to improve heat stability of said composition. It is general that addition of the antioxidant acts to slightly decrease the function of the light stabilizer. However, when the light stabilizer (B) represented by the above formula (1) is used in the polyacetal resin composition of this invention, the use of the antioxidant does not decrease the function of the light stabilizer (B) so much.

Examples of, the ultraviolet light absorber (C) as the component of the polyacetal resin composition in this invention include a compound having a benzotriazole skeleton, a compound having a benzophenone skeleton, a compound having a salicylate skeleton, a compound having an α-cyanoacrylate skeleton and a compound having an oxalic acid anilide skeleton.

Specific examples of the compound having the benzotriazole skeleton include 2-(2-hydroxy-5-methylphenyl)benzotriazole, 2-(2-hydroxy-3,5-di-tert-butylphenyl)benzotriazole, 2-(2-hydroxy-3,5-di-isoamylphenyl)benzotriazole, 2-[2'-hydroxy-3,5-bis(α,α-dimethylbenzyl)phenyl]benzotriazole and 2-(2-hydroxy-4-octoxyphenyl)benzotriazole.

Specific examples of the compound having the benzophenone skeleton include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-oxybenzylbenzophenone and 2-hydroxy-4-methoxy-5-sulfobenzophenone.

Specific examples of the compound having the salicylate skeleton include p-tert-butylphenyl salicylate and p-octylphenyl salicylate.

Specific examples of the compound having the α-cyanoacrylate skeleton include 2-ethylhexyl-2-cyano-3,3-diphenylacrylate and ethyl 2-cyano-3,3-diphenylacrylate.

Specific examples of the compound having the oxalic acid anilide skeleton include N-(2-ethoxy-5-tert-butylphenyl)oxalic acid diamide and N-(2-ethylphenyl)-N'-(2-ethoxyphenyl)oxalic acid diamide.

The synergistic use of the ultraviolet light absorber (C) and the light stabilizer (B) greatly improves weather resistance (light resistance) of the polyacetal resin composition of this invention.

Polyethylene (D) which is the component of the polyacetal resin composition in this invention include high-density and low-density polyethylenes. A weight average molecular weight of polyethylene (D) is preferably 10,000 to 1,000,000.

A number average molecular weight of polyethylene glycol (E) which is the component of the polyacetal resin composition in this invention is preferably 5,000 to 400,000, especially preferably 6,000 to 20,000.

The polymer (F) of the methacrylate ester which is the component of the polyacetal resin composition in this invention includes a homopolymer of a methacrylate ester and a copolymer of the methacrylate ester as the main component and the other monomer.

Specific examples of the methacrylate ester include methyl methacrylate, ethyl methacrylate, n-butyl methacrylate, isobutyl methacrylate, 2-ethylhexyl methacrylate, lauryl methacrylate, S[synthetic]-lauryl methacrylate, dodecylpentadecyl methacrylate, stearyl methacrylate and cyclohexyl methacrylate.

Examples of the other monomer copolymerizable with the methacrylate ester include styrene and ethylene. The amount of the other monomer contained in the polymer (F) of the methacrylate ester is 50% by weight or less.

A weight average molecular weight of the polymer (F) of the methacrylate ester is preferably 50,000 to 250,000.

The above polymers (F) of the methacrylate esters can be used either singly or in combination.

The polyacetal resin composition of this invention contain, as stated above, the polyethylene (D), the polyethylene glycol (E) and the polymer (F) of the methacrylate ester. The reason is that the polyacetal resin composition of this invention containing the three components, (D), (E) and (F) is superior in weather resistance (light resistance) to a polyacetal resin composition containing one or two of the components (D), (E) and (F). That is, in the polyacetal resin composition of this invention, weather resistance (light resistance) of the polyacetal resin of this invention can be markedly improved by concurrently using polyethylene (D), polyethylene glycol (E) and the polymer (F) of the methacrylate ester. Even in a severe weather resistance test, it is a long time before cracks occur. At the time cracks occur for the first time, almost no yellowing is observed. Further, no flow mark is substantially observed on a surface of a molded article obtained by injection-molding the polyacetal resin composition of this invention, and its commercial value, therefore, does not decrease. In addition, even when the components are melt-kneaded and extruded in an extruder in order to pelletize the polyacetal resin composition of this invention, a surging phenomenon and occurrence of a gum-like resin substance at a die are substantially not observed.

When one of polyethylene (D), polyethylene glycol (E) and the polymer (F) of the methacrylate ester is singly added to the polyacetal resin, an improvement in weather resistance of the polyacetal resin is small, and a new problem arises on the contrary.

For example, when polyethylene (D) is singly added to the polyacetal resin, a flow mark tends to occur on a surface of a molded article because of poor compatibility of polyethylene with the polyacetal resin.

When polyethylene glycol (E) is singly added to the polyacetal resin, compatibility with the polyacetal resin is good but heat resistance is poor. Consequently, when the polyacetal resin and polyethylene glycol are melt-mixed and extruded in the extruder, the gum-like resin substance which can be considered to be a heat-deteriorated substance of polyethylene glycol tends to occur at the die. In a composition of the polyacetal resin and polyethylene glycol, a problem of yellowing is given in the severe weather resistance test.

When the polymer (F) of the methacrylate ester is singly added to the polyacetal resin, almost no effect in improvement of weather resistance is found unless the amount of the polymer of the methacrylate ester is 10 parts by weight or more per 100 parts by weight of the polyacetal resin. If the polymer of the methacrylate ester is added in an amount of 10 parts by weight or more to improve weather resistance, surging often occurs in melt-mixing the polyacetal resin with the polymer of the methacrylate ester in the extruder.

By contrast, when polyethylene (D), polyethylene glycol (E) and the polymer (F) of the methacrylate ester are added to the polyacetal resin as in this invention, these three components mutually function, and compatibility of them with the polyacetal resin increases. Accordingly, the problems given by singly adding one of the components (D), (E) and (F), i.e., occurrence of the flow mark and occurrence of the gum-like resin substance and occurrence of surging in extrusion molding are in the composition of this invention, substantially suppressed and weather resistance (light resistance) is all the more superior.

Besides, according to the present inventors' findings, in the polyacetal resin composition of this invention, a suppression of bleedout of the light stabilizer (B) on the surface of the molded article of the polyacetal resin composition in this invention is brought forth by concurrent use of polyethylene (D), polyethylene glycol (E) and the polymer (F) of the methacrylate ester.

In the polyacetal resin composition of this invention, the light stabilizer (B), the ultraviolet light absorber (C), polyethylene (D), polyethylene glycol (E) and the polymer (F) of the methacrylate ester are contained in the following amounts per 100 parts by weight of the polyacetal resin (A).

(B) Light stabilizer:
0.1 to 1.5 parts by weight, preferably
0.1 to 0.5 part by weight
(C) Ultraviolet light stabilizer:
0.1 to 1.5 parts by weight, preferably
0.1 to 0.5 part by weight
(D) Polyethylene:
0.1 to 3.0 parts by weight, preferably
0.5 to 3.0 parts by weight
(E) Polyethylene glycol:
0.1 to 5.0 parts by weight, preferably
0.5 to 3.0 parts by weight
(F) Polymer of the methacrylate ester:
0.1 to 10 parts by weight, preferably
0.5 to 5.0 parts by weight Since the amount of each of the components (A) to (F) is within the aforesaid ranges, mechanical properties and weather resistance of the polyacetal resin composition in this invention are kept good, occurrence of the gum-like resin substance at the die and occurrence of surging are substantially eliminated in melt-kneading and extruding the components in the extruder, and the flow mark on the surface of the injection-molded article and the bleedout of additives onto the surface of the injection-molded article substantially do not occur.

The polyacetal resin composition of this invention can contain, in addition to the aforesaid additives, a variety of other additives unless hindering achievement of the objects of this invention.

Examples of the other additives that can be added to the polyacetal resin composition of this invention are an antioxidant, a filler such as carbon black, a pigment, a surface active agent, an antistatic agent, a lubricant and a nucleating agent.

The polyacetal resin composition of this invention can be prepared by melt-kneading the components with a melt-kneading device known per se, such as a single-screw extruder, a twin-screw extruder or a kneader.

The components are, before melt-kneaded, mixed with a dry-blending device such as a super-mixer.

Generally, the melt-kneaded components are extruded into strands, and the strands are either cooled with water and then cut or cut in water, and obtained as pellets.

The polyacetal resin composition of this invention can readily be molded by any of the molding methods known per se, such as an injection molding method, an extrusion molding method, a compression molding method, a blow molding method, a vacuum molding method or a foam molding method.

Since the polyacetal resin composition of this invention is quite excellent in weather resistance (light resistance) while it retains properties inherent in the polyacetal resin, the composition can be used as a material of parts which are used in positions that are exposed to sunlight or indoor lighting for a long time and further to wind and rain, for example, automobile outdoor handles, wheel covers and front fenders, parts of electric appliances, building components, packers of vinyl plastic hothouses, and so forth.

The reasons that the molded article formed of the polyacetal resin composition in this invention has excellent weather resistance (light resistance) are mentioned below.

When the polyacetal resin is injection-molded, the molten resin injected into a mold starts to crystallize at the same time said resin is rapidly cooled. Since a temperature of a cavity of the mold is lower than that of the molten resin, a nearly amorphous skin layer, an oriented bell-like spherulite layer and a non-bell-like spherulite layer are formed inwardly from a surface of a molded article. Since a difference between the temperature of the resin surface and the temperature inside the resin is great, an internal stress occurs between the skin layer and the oriented bell-like spherulite layer and concentrates near the oriented bell-like spherulite layer. When such a molded article is exposed to light, the skin layer is first oxidized. After the skin layer is oxidized to some extent, cracks occur and grow owing to a promoting action of the internal stress which is intensively present near the oriented bell-like spherulite layer. In consequence, the polyacetal resin molded article is inferior in weather resistance (light resistance).

On the other hand, in the molded article of the polyacetal resin composition in this invention, polyethylene (D), polyethylene glycol (E) and the polymer (F) of the methacrylate ester form fine mixed crystals with the polyacetal resin (A) in a surface layer which is up to at least 100 μm from the surface of the molded article, and the oriented bell-like spherulite layer formed of the polyacetal resin almost disappears.

Since the molded article of the polyacetal resin composition in this invention has the aforesaid surface layer structure and the concentration of the internal stress is alleviated near the surface layer, occurrence and growth of cracks at the surface of the molded article are hindered, and as a result, the molded article is excellent in weather resistance (light resistance).

Figure 2:
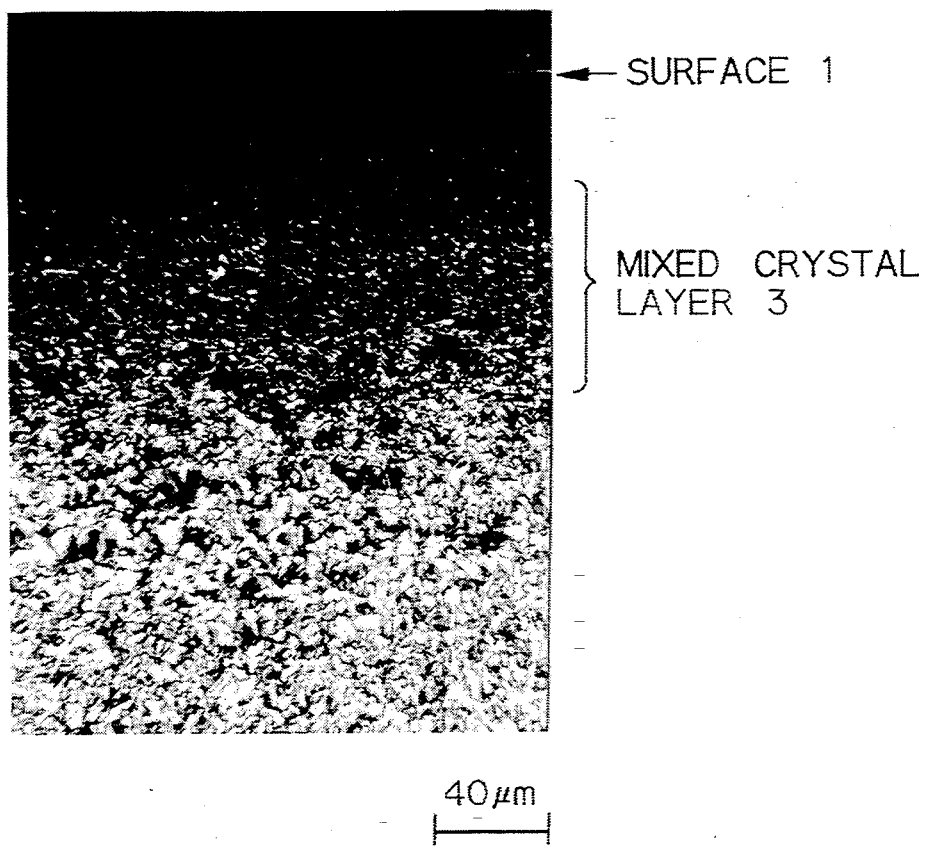
FIG. 2 is a photo, taken by a polarizing microscope, of a section of a portion near a surface of an injection-molded article of a polyacetal resin composition in this invention (a polyacetal resin composition in Example 1).

The above fact is proved by FIGS. 1 and 2. That is, FIG. 1 is a photo, taken by a polarizing microscope, of a surface layer of an injection-molded article of a polyacetal resin. FIG. 2 is a photo, taken by a polarizing microscope, of a surface layer of an injection-molded article of a polyacetal resin composition in this invention (a polyacetal resin composition in Example 1 which will be later described).

FIG. 1 shows that in the injection-molded article of the polyacetal resin, bell-like spherulites are formed vertically relative to the surface 1 to give an oriented bell-like spherulite layer 2 in vicinity of the surface layer. On the other hand, FIG. 2 shows that in the injection-molded article of the polyacetal resin composition in this invention, polyethylene (D), polyethylene glycol (E) and the polymer (F) of the methacrylate ester incorporated in said composition hinder formation of the oriented bell-like spherulites of the polyacetal resin, with the result that the oriented bell-like spherulite layer 2 of the polyacetal resin disappears and a mixed crystal layer 3 formed of fine mixed crystals occurs in the surface layer which is up to 100 to 120 μm from the surface of said article.

This invention will be specifically explained below by referring to Examples and Comparative Examples. However, the scope of this invention is not limited by said Examples.

Components used in the following Examples and Comparative Examples are as follows.

(A) Polyacetal resin:
POM: polyacetal resin, Iupital (trade name), MFR 10 g/10 min. (made by Mitsubishi Gas Chemical Company Inc.)

(B) Light stabilizer:
B-1: bis-(N-methyl-2,2,6,6-tetramethyl-4-piperidyl)-sebacate
B-2: bis(2,2,6,6-tetramethyl-4-piperidyl)sebacate
B'-3: bis-(2,2,6,6-tetramethyl-4-piperidyl)succinate
B'-4: condensation product of dimethyl succinate and 1-(2-hydroxyethyl)-4-hydroxy-2,2,6,6-tetramethylpiperidine (C) Ultraviolet light absorber:
C-1: 2-[2-hydroxy-3,5-bis($\alpha,\alpha$-dimethylbenzyl)phenyl]benzotriazole
C-2: bis-(5-benzoyl-4-hydroxy-2-methoxyphenyl)methane
C-3: 2-(2-hydroxy-3-dodecyl-5-methylphenyl)benzotriazole
C-4: condensation product of methyl 3-[3-tert-butyl-5-(2H-benzotriazol-2-yl)-4-hydroxyphenyl)propionate and polyethylene glycol (D) Polyethylene:
D-1: polyethylene having a weight average molecular weight of 300,000
D-2: polyethylene having a weight average molecular weight of 50,000
D-3: polyethylene having a weight average molecular weight of 120,000
D-4: polyethylene having a weight average molecular weight of 500,000
D-5: polyethylene having a weight average molecular weight of 800,000

(E) Polyethylene glycol:
E-1: polyethylene glycol having a number average molecular weight of 20,000
E-2: polyethylene glycol having a number average molecular weight of 6,000

(F) Polymer or copolymer of a methacrylate ester:
F-1: polymethyl methacrylate having a weight average molecular weight of 94,000
F-2: polymethyl methacrylate having a weight average molecular weight of 60,000
F-3: methyl methacrylate (MMA)/styrene (St) copolymer (MMA unit/St unit molar ratio=80/20)
F-4: methyl methacrylate/styrene copolymer (MMA unit/St unit molar ratio=60/40)
F-5: graft copolymer of low-density polyethylene (LDPE) and polymethyl methacrylate (PMMA) (LDPE/PMMA weight ratio=50/50)

(G) Other additives:
G-1: tetrakis[methylene-3-(3,5-di-tert-butyl-4-hydroxyphenyl)propionate]-methane
G-2: melamine
G-3: calcium stearate

EXAMPLES 1 TO 24

Comparative Examples 1 to 14

0.30 Parts by weight of G-1, 0.20 parts by weight of G-2, 0.05 part by weight of G-3 and components shown in Tables 1 to 5 were first mixed in amounts shown in Tables 1 to 5 with a super-mixer (manufactured by Kawada Seisakusho K.K.), and then extruded into strands while melt-kneading the resulting mixture with a twin-screw extruder (PCM-30, manufactured by Ikegai Iron Works, Ltd., a screw diameter 30 mm) under conditions that the number of screw revolutions was 50 rpm and a cylinder set temperature was 220° C. The strands were cooled with water and then cut to obtain pellets.

The obtained pellets were dried with a hot-air dryer at 80° C. for 4 hours, and the dried pellets were injection-molded with an injection molding machine (model: SG 125, manufactured by Sumitomo Shipbuilding & Machinery Co., Ltd., a theoretical injection shot volume 163 ml) to form rectangular test pieces (size—3.2 mm×12.7 mm×63.6 mm) for weather resistance test. The injection molding conditions were that a mold temperature was 80° C., a cylinder temperature was 200° C., an injection pressure was 800 kg/cm$^2$ and a molding cycle was 40 seconds.

In Example 24, however, pellets were first formed from 100 parts by weight of POM, 0.30 part by weight of G-1, 0.20 parts by weight of G-2, 0.05 part by weight of G-3, 0.35 part by weight of B-1 and 0.35 part by weight of C-1 by the above method, and 1.0 part by weight of D-1, 1.0 part by weight of E-1 and 1.0 part by weight of F-1 were then added to 100 parts by weight of the pellets. They were melt-mixed again to obtain pellets. The thus obtained pellets were subjected to injection molding.

(1) Evaluation of moldability:
  (i) Occurrence of a flow mark on surfaces of the rectangular test pieces prepared by the injection molding was observed.
  (ii) It was observed whether or not a gum-like resin substance occurred in a die and whether or not surging occurred, when melt-kneading and extruding the components with a twin-screw extruder to obtain strands.
(2) Evaluation of weather resistance (light resistance): The rectangular test pieces were subjected to a weather resistance test with a weatherometer (model: WBL-SUN-HCH, manufactured by Suga Shikenki K.K.) at a black panel temperature of 83° C. without rainfall spray. Said rectangular test pieces were taken out from the weatherometer every 50 hours, and occurrence of cracks was observed with an unaided eye. The time when the cracks occurred for the first time was designated as a crack occurrence time. Further, it was observed whether or not the test pieces yellowed on that occasion.
(3) Bleedout:
  It was observed with an unaided eye whether or not the additives bled out on the surfaces of the rectangular test pieces until the cracks occurred under the aforesaid conditions of the weather resistance test.

The results are shown in Tables 1 to 5.

TABLE 1

| Components[1] | \multicolumn{9}{c}{Examples} |
|---|---|---|---|---|---|---|---|---|---|
| | 1 | 2 | 3 | 4 | 5 | 6 | 7 | 8 | 9 |
| POM | 100 | 100 | 100 | 100 | 100 | 100 | 100 | 100 | 100 |
| B-1 | 0.35 | 0.35 | 0.35 | 0.35 | 0.35 | 0.35 | 0.35 | 0.35 | 0.50 |
| C-1 | 0.35 | 0.35 | 0.35 | 0.35 | 0.35 | 0.35 | 0.35 | 0.35 | 0.50 |
| D-1 | 1.00 | — | — | — | — | 0.50 | 2.00 | 3.00 | — |
| D-2 | — | 1.00 | — | — | — | — | — | — | — |
| D-3 | — | — | 1.00 | — | — | — | — | — | 1.0 |
| D-4 | — | — | — | 1.00 | — | — | — | — | — |
| D-5 | — | — | — | — | 1.00 | — | — | — | — |
| E-1 | 1.00 | 1.00 | 1.00 | 1.00 | 1.00 | 0.50 | 2.00 | 3.0 | 1.0 |
| F-1 | 1.00 | 1.00 | 1.00 | 1.00 | 10.0 | 0.50 | 2.00 | 3.0 | 1.0 |
| Crack occurrence time | 1450 | 1300 | 1200 | 1200 | 1300 | 900 | 1500 | 1600 | 1500 |
| Yellowing | no | no | no | no | no | no | no | slight | no |
| Flow mark | no | no | no | no | no | no | no | slight | no |
| Gum-like resin substance | no | no | no | no | no | no | no | slight | no |
| Surging | no | no | no | no | no | no | no | no | no |
| Bleedout | no | no | no | no | no | no | no | no | no |

[1] Amounts of the components are expressed by "parts by weight".

TABLE 2

| Components[1] | \multicolumn{7}{c}{Examples} |
|---|---|---|---|---|---|---|---|
| | 10 | 11 | 12 | 13 | 14 | 15 | 16 |
| POM | 100 | 100 | 100 | 100 | 100 | 100 | 100 |
| B-1 | 0.35 | 0.35 | 0.35 | 0.35 | 0.35 | 0.35 | 0.35 |
| C-1 | 0.35 | 0.35 | 0.35 | 0.35 | 0.35 | 0.35 | 0.35 |
| D-1 | 0.10 | 3.00 | 1.00 | 1.00 | 1.00 | 1.00 | 1.00 |
| E-1 | 1.00 | 5.00 | — | 1.00 | 1.00 | 1.00 | 1.00 |
| E-2 | — | — | 1.00 | — | — | — | — |
| F-1 | 10.0 | 10.0 | 1.00 | — | — | — | — |
| F-2 | — | — | — | 1.00 | — | — | — |
| F-3 | — | — | — | — | 1.00 | — | — |
| F-4 | — | — | — | — | — | 1.00 | — |
| F-5 | — | — | — | — | — | — | 1.00 |
| Crack occurrence time | 1200 | 1700 | 1450 | 1400 | 1200 | 1150 | 1150 |
| Yellowing | no | slight | no | no | no | no | no |
| Flow mark | no | slight | no | no | no | no | no |
| Gum-like resin substance | no | slight | no | no | no | no | no |
| Surging | no | no | no | no | no | no | no |
| Bleedout | no | no | no | no | no | no | no |

[1] Amounts of the components are expressed by "parts by weight".

TABLE 3

| Components[1] | \multicolumn{8}{c}{Examples} |
|---|---|---|---|---|---|---|---|---|
| | 17 | 18 | 19 | 20 | 21 | 22 | 23 | 24 |
| POM | 100 | 100 | 100 | 100 | 100 | 100 | 100 | 100 |
| B-1 | — | 0.35 | 0.35 | 0.35 | — | — | — | 0.35 |
| B-2 | 0.35 | — | — | — | 0.35 | 0.35 | 0.35 | — |
| C-1 | 0.35 | — | — | — | — | — | — | 0.35 |
| C-2 | — | 0.35 | — | — | 0.35 | — | — | — |
| C-3 | — | — | 0.35 | — | — | 0.35 | — | — |
| C-4 | — | — | — | 0.35 | — | — | 0.35 | — |
| D-1 | 1.00 | 1.00 | 1.00 | 1.00 | 1.00 | 1.00 | 1.00 | 1.00 |
| E-1 | 1.00 | 1.00 | 1.00 | 1.00 | 1.00 | 1.00 | 1.00 | 1.00 |
| F-1 | 1.00 | 1.00 | 1.00 | 1.00 | 1.00 | 1.00 | 1.00 | 1.00 |
| Crack occurrence time | 1450 | 1450 | 1300 | 1450 | 1450 | 1400 | 1450 | 1450 |
| Yellowing | no | no | no | no | no | no | no | no |
| Flow mark | no | no | no | no | no | no | no | no |

TABLE 3-continued

| Components[1] | Examples | | | | | | | |
|---|---|---|---|---|---|---|---|---|
| | 17 | 18 | 19 | 20 | 21 | 22 | 23 | 24 |
| Gum-like resin substance | no | no | no | no | no | no | no | no |
| Surging | no | no | no | no | no | no | no | no |
| Bleedout | no | no | no | no | no | no | no | no |

[1]Amounts of the components are expressed by "parts by weight".

TABLE 4

| Components[1] | Comparative Examples | | | | | | | |
|---|---|---|---|---|---|---|---|---|
| | 1 | 2 | 3 | 4 | 5 | 6 | 7 | 8 |
| POM | 100 | 100 | 100 | 100 | 100 | 100 | 100 | 100 |
| B-1 | 0.35 | 0.35 | 0.35 | — | 0.35 | 0.35 | 0.35 | — |
| B-2 | — | — | — | 0.35 | — | — | — | 0.35 |
| C-1 | 0.35 | 0.35 | 0.35 | 0.35 | 0.35 | 0.35 | 0.35 | 0.35 |
| D-1 | 1.00 | 2.00 | — | — | — | — | — | — |
| E-1 | — | — | 1.00 | 1.00 | — | — | — | — |
| F-1 | — | — | — | — | 5.00 | 10.0 | — | — |
| Crack occurrence time | 700 | 650 | 800 | 800 | 550 | 600 | 550 | 550 |
| Yellowing | no | no | yes | yes | no | no | no | no |
| Flow mark | no | yes | no | no | no | no | no | no |
| Gum-like resin substance | no | no | yes | yes | no | no | no | no |
| Surging | no | no | no | no | yes | yes | no | no |
| Bleedout | no | no | no | yes | no | no | no | yes |

[1]Amounts of the components are expressed by "parts by weight".

TABLE 5

| Components[1] | Comparative Examples | | | | | |
|---|---|---|---|---|---|---|
| | 9 | 10 | 11 | 12 | 13 | 14 |
| POM | 100 | 100 | 100 | 100 | 100 | 100 |
| B-1 | 0.35 | 0.35 | 0.35 | — | — | — |
| B-2 | — | — | — | 0.35 | — | — |
| B'-3 | — | — | — | — | 0.35 | — |
| B'-4 | — | — | — | — | — | 0.35 |
| C-1 | 0.35 | 0.35 | 0.35 | 0.35 | 0.35 | 0.35 |
| D-1 | 1.00 | — | 1.00 | 1.00 | 1.00 | 1.00 |
| E-1 | 1.00 | 1.00 | — | 1.00 | 1.00 | 1.00 |
| F-1 | — | 1.00 | 5.00 | — | 1.00 | 1.00 |
| Crack occurrence time | 1000 | 800 | 650 | 1100 | 1400 | 900 |
| Yellowing | no | no | no | no | no | no |
| Flow mark | no | no | no | no | no | no |
| Gum-like resin substance | no | no | no | no | no | no |
| Surging | no | no | no | no | no | no |
| Bleedout | no | no | no | yes | yes | no |

[1]Amounts of the components are expressed by "parts by weight".

What we claim is:

1. A polyacetal resin composition which comprises:
(A) 100 parts by weight of a polyacetal resin,
(B) 0.1 to 1.5 parts by weight of at least one kind selected from the group of light stabilizers represented by the following formula (1)

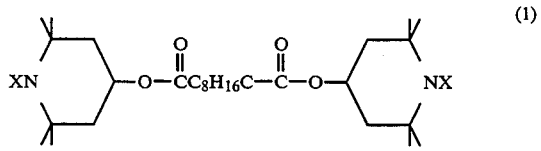

wherein two X's are the same or different and each denotes a hydrogen atom or a methyl group,
(C) 0.1 to 1.5 parts by weight of an ultraviolet light absorber,
(D) 0.1 to 3 parts by weight of polyethylene,
(E) 0.1 to 5 parts by weight of polyethylene glycol, and
(F) 0.1 to 10 parts by weight of a polymer of a methacrylate ester.

2. The polyacetal resin composition of claim 1 which is prepared by uniformly kneading the components (A) to (F) while melting the component (A).

3. The polyacetal resin composition of claim 1 wherein the ultraviolet light absorber (C) is at least one compound selected from the group consisting of a compound having a benzotriazole skeleton, a compound having a benzophenone skeleton, a compound having a salicylate skeleton, a compound having an α-cyanoacrylate skeleton and a compound having an oxalic acid anilide skeleton.

4. The polyacetal resin composition of claim 1 wherein the polymer (F) of the methacrylate ester is at least one polymer selected from the group consisting of a homopolymer of the methacrylate ester and a copolymer of the methacrylate ester as the main component and the other monomer.

5. The polyacetal resin composition of claim 1 which can give a molded article wherein in a surface layer that is up to at least 100 μm from the surface of the molded article, polyethylene (D), polyethylene glycol (E) and the polymer (F) of the methacrylate ester form fine mixed crystals with the polyacetal resin (A) and an oriented bell-like spherulite layer of the polyacetal resin disappears.

6. An article which is formed by injection-molding the polyacetal resin composition of claim 1.

7. The article of claim 6 wherein in a surface layer that is up to at least 100 μm from the surface of the molded article, polyethylene (D), polyethylene glycol (E) and the polymer (F) of the methacrylate ester form fine mixed crystals with the polyacetal resin (A) and an oriented bell-like spherulite layer of the polyacetal resin disappears.

* * * * *

UNITED STATES PATENT AND TRADEMARK OFFICE
CERTIFICATE OF CORRECTION

PATENT NO.  : 5,432,216
DATED       : July 11, 1995
INVENTOR(S) : Jian YU et al.

It is certified that error appears in the above-indentified patent and that said Letters Patent is hereby corrected as shown below:

In claim 1, col. 11, the top portion of column 2 and in the Abstract, change formula (1) in each case from:

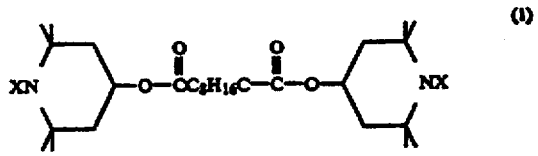

to

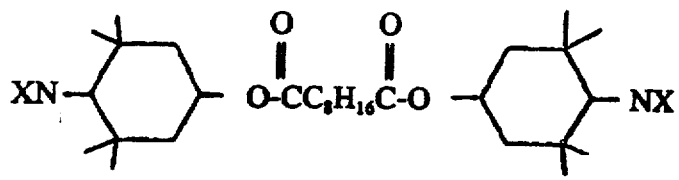

Signed and Sealed this

Twenty-fourth Day of September, 1996

*Attest:*

BRUCE LEHMAN

*Attesting Officer*     Commissioner of Patents and Trademarks